Jan. 17, 1933.  O. U. ZERK  1,894,456
UNIVERSAL PANORAMIC TRIPOD HEAD
Filed Sept. 19, 1927  5 Sheets-Sheet 1
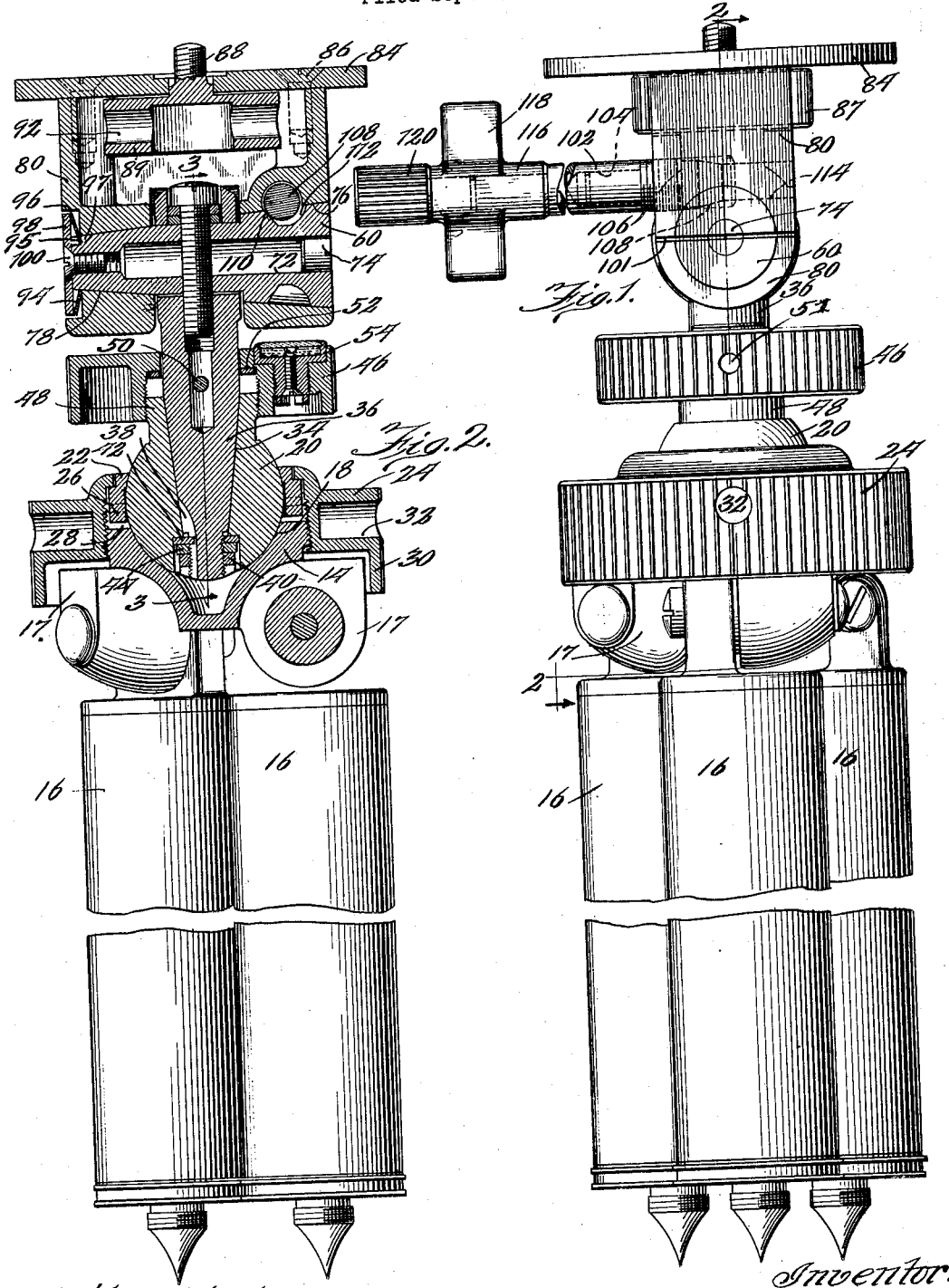
Inventor:
Oscar U. Zerk Jan. 17, 1933.　　　O. U. ZERK　　　1,894,456
UNIVERSAL PANORAMIC TRIPOD HEAD
Filed Sept. 19, 1927　　5 Sheets-Sheet 2
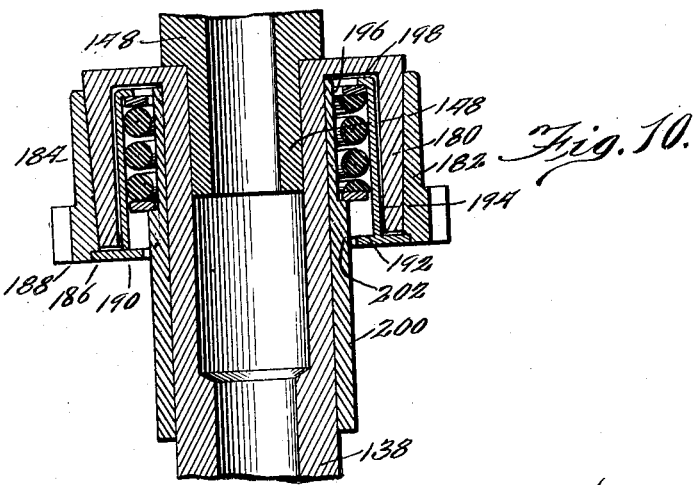
Fig. 10.
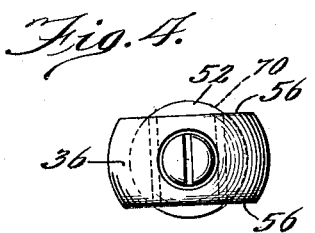
Fig. 4.
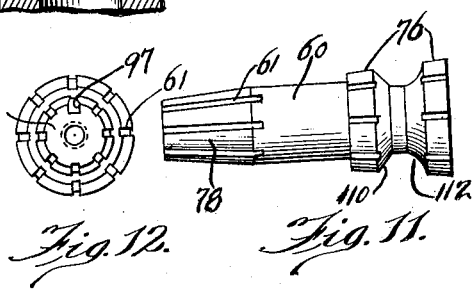
Fig. 12.　Fig. 11.
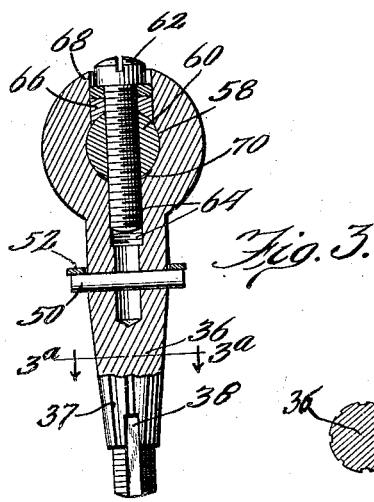
Fig. 3.
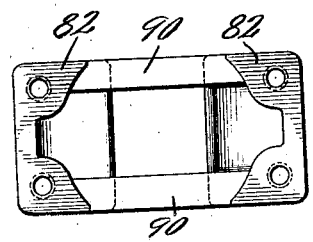
Fig. 5.
Fig. 3ª.
Witnesses:
Harry H. Hitzman
Ja. D. Perry
Inventor:
Oscar U. Zerk
By Williams, Bradbury, McCaleb & Hinkle
Attys

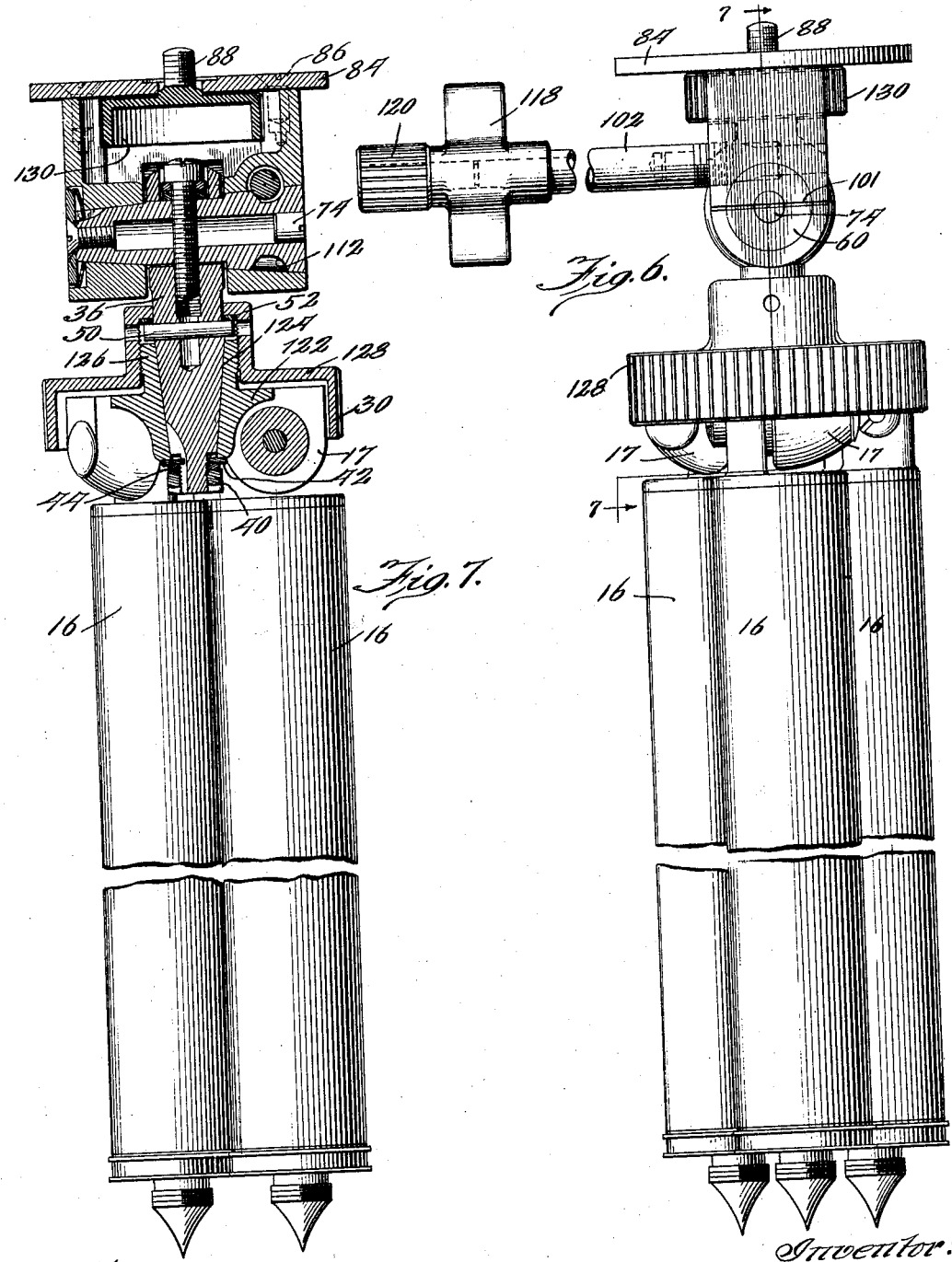

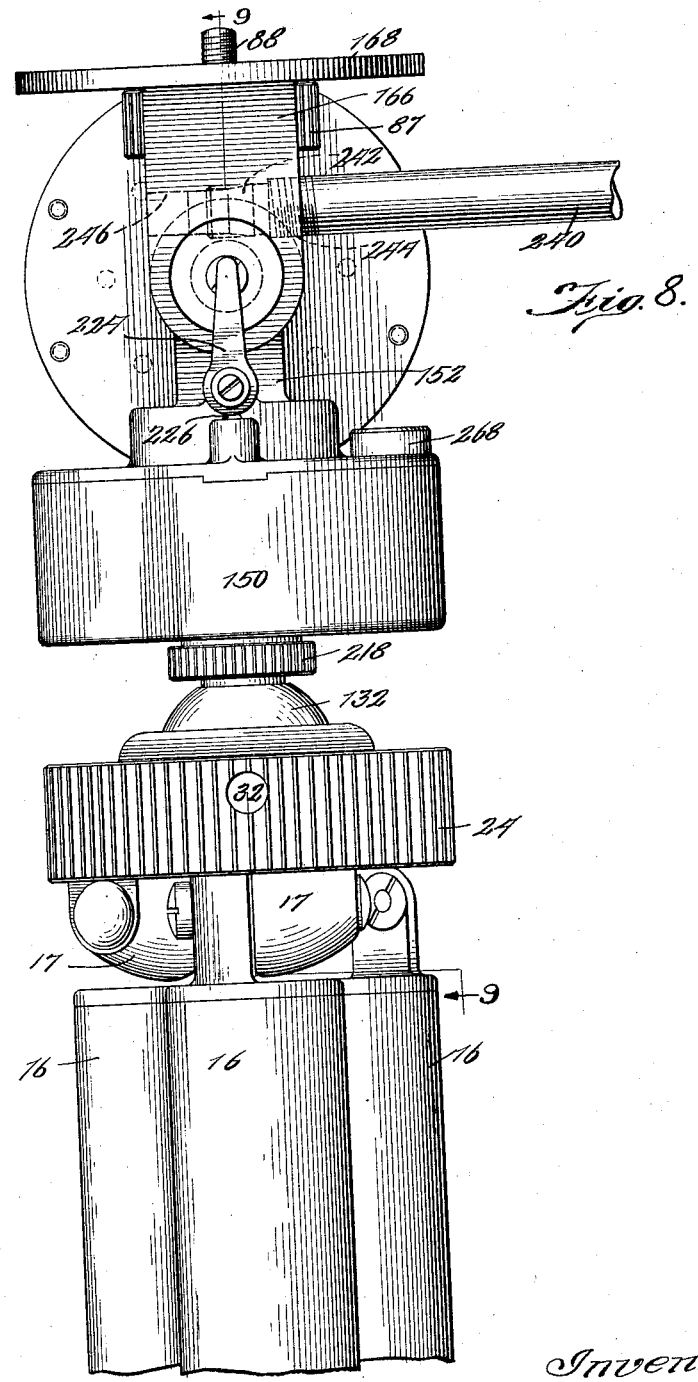

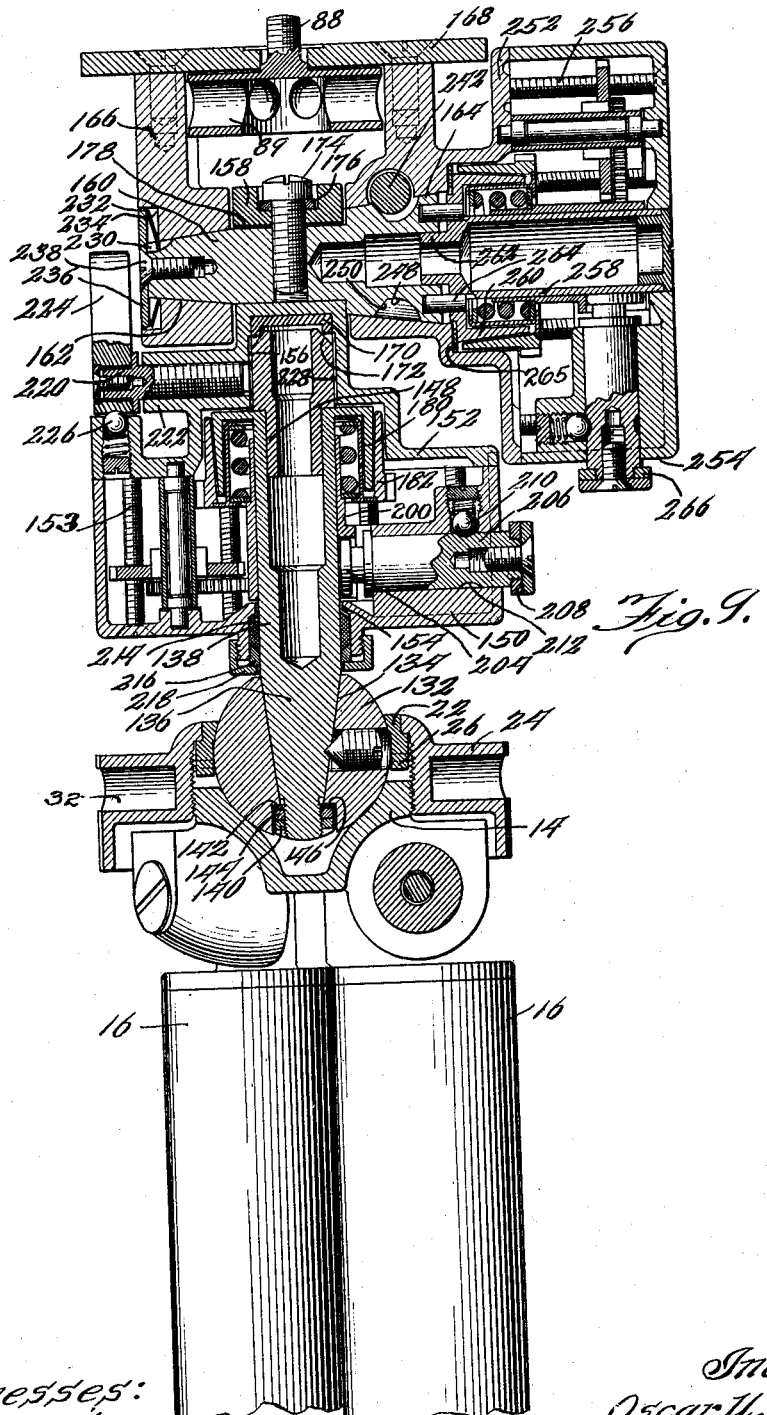

Patented Jan. 17, 1933

1,894,456

UNITED STATES PATENT OFFICE

OSCAR U. ZERK, OF CHICAGO, ILLINOIS

UNIVERSAL PANORAMIC TRIPOD HEAD

Application filed September 19, 1927. Serial No. 220,494.

My invention relates generally to apparatus for universally supporting cameras and other instruments, and more particularly to specific forms of tripod heads.

In motion picture photography it is frequently necessary or desirable to focus the camera upon a horizontally or vertically moving object, or to take a panoramic view of an object, all of which would not appear within the field of the camera if held stationary. My invention contemplates the provision of improved means for mounting a camera so that such panoramic views may be photographed. The tripod head of my invention is particularly adapted for use with small amateur motion picture cameras but may, with suitable changes, be adapted for use with professional motion picture cameras and other instruments such as range finders, etc.

For convenience, the horizontal or transversing rotation of the camera will be referred to as the "pan" and the vertical or elevational rotation thereof will be referred to as the "tilt". In the "pan" and "tilt" of the camera it is sometimes desirable to have means to steady the motion of the camera so as to prevent the reproduction of the view being taken from appearing jerky and uneven. In one modification of my invention I have provided means for accomplishing this result.

Among the objects of my invention are:

First, to provide a universally movable support for a camera which is simple in construction, may be easily operated, is light in weight, and in which the parts are so conformed as to fit rigidly together with substantially no play;

Second, to provide improved means for exerting the frictional force tending to retard rotation of the camera support about vertical and horizontal axes;

Third, to provide improved means for locking the support against rotation about a vertical axis;

Fourth, to provide improved means for preventing the rotation of the camera support about a horizontal axis;

Fifth, to provide improved means for securing the horizontal tapered pin in a diametrical bore of the vertical tapered pin;

Sixth, to provide an improved universal camera support in which means are provided to steady the rotative movement of the camera, and to provide manipulative devices for rendering said means inoperative.

Other objects will appear from the following description, reference being had to the accompanying drawings in which:

Figure 1 is an elevation of my improved tripod head;

Figure 2 is a central vertical cross section thereof taken on the line 2—2 of Figure 1;

Figure 3 is a vertical cross section of the means used to secure the tapered pins together, taken on a line 3—3 of Figure 2;

Figure 3a is a transverse sectional view taken on the line 3a—3a of Figure 3;

Figure 4 is a plan view of said securing means;

Figure 5 is a plan view of the "tilt" socket;

Figure 6 is a side elevation of a modified form of head structure;

Figure 7 is a central vertical cross section thereof taken on the line 7—7 of Figure 6;

Figure 8 is a side elevation of a second modified form of head in which means are included to steady the camera in taking "pan" or "tilt" views;

Figure 9 is a central vertical section thereof taken on the line 9—9 of Figure 8; and Figure 10 is an enlarged central vertical section of the clutch mechanism used in connecting and disconnecting the steadying mechanism, in operated position.

Figure 11 is a side and Figure 12 an end elevation of the tilt pivot pin used in the heads shown in Figs. 1 and 7.

Referring to Figures 1 to 5, the form of head structure thereby illustrated comprises a plate 14 to which the tripod legs 16 are pivotally connected at hinge lugs 17. The plate 14 has a central concavity with a spherical surface 18 which forms a seat for the ball 20. A clamping ring 22 has a surface to conform with the shape of the ball 20 and is adapted to be drawn towards the head plate by a flanged nut 24. The ring 22 has a pair of lugs 26 which depend into complementary slots 28 formed in the head plate 14. These lugs thus prevent rotation of the ring as it is clamped against the ball by turning down the nut 24. The nut has depending flange 30 which fits over and protects the hinge construction from damage by blows and to a certain extent prevents dirt from getting into the hinge bearings. The nut has a plurality of radially drilled holes 32 into which the end of a rod or operating handle, as will later be described, may be inserted so as to obtain greater leverage in manipulating the nut.

The ball 20 has a tapered bore 34 which is adapted to receive a complementally tapered post or pin 36. The lower end of the latter has a key slot 38 cut therein and is threaded to receive a kerfed nut 40. A hardened steel washer 42 has a key projection fitting into the key slot 38 and is thus held against rotation relative to the tapered pin 36. A heavy spring lock washer 44 is interposed between the flat washer 42 and the nut 40. The tapered pin 36 is thus rotatable within the ball 20 but its free rotation is slightly retarded by the friction resultant from the pressure of the lock washer in drawing the pin into the tapered bore of the ball.

The pin 36 preferably has a plurality of shallow relatively wide grooves 37 cut longitudinally of its tapered portion. The sharp edges of these grooves scrape the tapered bore of the ball 20 and free the surface of the thin layer of aluminum oxide which tends to form, while the grooves permit the scraped oxide or other foreign material to fall from the bearing.

Additional means are provided for increasing the pressure between the pin 36 and the ball 20. This means comprises a large internally threaded plate 46 which is screwed over a threaded boss 48 formed at the top of ball 20. A pin 50, passing diametrically through the tapered pin 36, has a tight fit therein, a hole 51 being provided in the plate 46 so that access thereto may be had for its removal. A hardened steel washer 52 rests upon the pin 50 and provides a surface for reducing friction as the plate 46 is turned relative to the tapered pin 36. By screwing down the plate 46 over the boss 48, the pin 36 will be firmly clamped in the tapered bore 34 of the ball 20. A small spirit level 54 is screwed into the top of the plate 46 and serves as a means for indicating when the tapered pin 36 is exactly vertical. The upper end of the tapered pin 36 (Figures 3 and 4) is enlarged and has its sides flattened as at 56, and is transversely drilled at 58 to receive the horizontal tapered pintle 60. A cap screw 62 passes freely through the pintle 60 and is threaded in the tapered pin 36 at 64. A washer 66 shaped to conform to the cylindrical surface of the pintle 60 is firmly pressed against the pintle by a heavy lock washer 68.

It will be noted that a wide shallow groove 70 is cut in the bore 58. This groove is provided for the purpose of distributing the pressure exerted between the pintle 60 and the pin 36 and prevents the possibility of any shaking or rocking of the pintle 60 relative to the pin 36, since the pintle is clamped between the washer 66 and the portions of the bore 58 adjacent the groove 70 so that the force exerted by the lock washer extends vertically downward in a line lying between the two bearing surfaces adjacent the groove 70. The horizontal pintle is preferably made hollow for lightness, the end of the bore 72 being closed by a plug 74, and has a plurality of grooves 61 cut in its tapered bearing surfaces. These grooves are similar to the grooves 37 in the pin 36 and serve a similar purpose.

The pintle 60 has two similarly tapered portions 76 and 78 which serve as bearing surfaces for the "tilt" socket member 80. This member has upwardly extending side portions 82 upon which a camera plate 84 is secured by screws 86. A camera attaching screw 88 having an enlarged hollow head 89 is guided for free rotation within this plate and has its head supported upon ledges 90. This head portion 89 of the screw 88 has a plurality of radially drilled holes 92 adapted to receive the end of an operating handle or a rod whereby additional leverage may be had to secure the camera against the plate 84. The "tilt" socket member 80 is normally retained with its tapered bores in frictional contact with the tapered surfaces 76 and 78 of the pintle 60 by a spring disc washer 94 positioned within a recess 96 formed in the "tilt" socket member 80. The washer 94 presses against plate 98 which is secured to the left hand end (Figure 2) of the pintle 60 by a screw 100 and thus at all times tends to move the "tilt" socket member 80 to the right, thereby automatically taking up any play which may be present between these parts. Rotation of the spring washer is prevented, it having a key projection 95, fitting in a key slot 97 in the pintle.

I have also provided means for locking the "tilt" socket member in adjusted position. This means comprises a handle 102 having an end piece 104 pressed therein. This end piece is threaded at 106 into the socket member 80 and has a tapered portion 108 which is adapted to contact with the frusto-conical surface 110 of an annular groove 112 formed in the pintle 60. The end piece 104 of the handle also has a cylindrical extension 114 which may be inserted within the holes 32 or 92 when the handle is used as a lever in the manipulation of the parts 24 and 89 respectively. The handle 102 has a finger piece 116 pressed thereon, the latter having diametrically oppositely extending wings 118 and a striated portion 120 by which the handle may be conveniently manipulated. When the handle is rotated clockwise (Figure 2) the handle being in the position shown in Figure 1, the frusto-conical portion 108 will tend to force the "tilt" socket member 80 to the right with respect to the pintle 60, thus more firmly wedging these parts together. With a very small turning moment the parts may be so firmly clamped that a huge force would be required to rotate the socket member 80 about the pintle 60. A groove 101 is cut horizontally and diametrically through the side surface of the member 80 and end surface of pintle 60. This groove serves as a convenient means for indicating when the camera is level.

In the use of this head the camera is first attached to the head by turning the screw 88 into the threaded socket customarily found in the camera and after the plate 14 has been approximately leveled by adjustment of the positions of the legs 14, the nut 24 is unscrewed so as to release the ball 20 for free universal movement relative to the weight. By observing the indications of the spirit level 54 the tapered pin 36 may be brought into exact vertical position and then clamped by turning down the nut 24.

If it is desired to have the camera universally movable the plate 46 is unscrewed so that the pin 36 may be rotated relative to the ball 20, such rotation being retarded only by the friction between the parts resultant from the pressure exerted by the lock washer 44. The handle 102 is then rotated counter-clockwise (Figure 2) so that the "tilt" socket member 80 is freely rotatable relative to the pintle 60, there being only a slight frictional drag due to the friction between the tapered bearing surfaces resultant from the pressure exerted by the disc washer 94.

If it is desired to take a "tilt" view, the plate 46 is screwed down, thereby clamping the tapered pin 36 to the ball. The camera may then be swung about the pintle 60, using the handle 102. The handle is sufficiently long so that the operator is able to move the camera fairly steadily.

If it is desired to take a "pan" view the handle 102 is turned clockwise (Figure 2) so as to frictionally lock the socket member 80 on the pintle 60 in the desired position relative thereto, and the plate 46 screwed up so as to permit the tapered pin 36 to rotate with respect to the ball 20. Again using the handle 102 as an operating lever, the camera may be rotated about the vertical axis of the tapered pin 36. The device above described thus serves as a universal mounting for a camera, or other instrument, in which there is a minimum of play and which can readily be adjusted for taking "pan" or "tilt" views.

In the modification shown in Figures 6 and 7 I have provided a structure similar to that previously described but which may be more economically manufactured due to great simplicity in its construction. Most of the parts of this device are exactly similar to those of the head previously described, with the exception that the parts are made smaller and that instead of rotatably mounting the vertical tapered pin in a universally adjustable ball I have rotatably mounted this pin directly in the head plate. I will proceed to describe the parts of this structure which differ from those previously described. I have designated parts which are similar to those shown in Figures 1 to 5 by the same reference characters. In some instances these parts are not identical but bear such close resemblance in shape and function that this manner of designation will, I believe, not lead to confusion.

Referring to Figures 6 and 7, the head plate 122 which has the hinge lugs 17 formed integrally therewith, has a vertically tapered bore 124 which is adapted to receive the tapered pin 36. The plate 122 has an upwardly extending boss 126 which is externally threaded to receive the internally threaded cap nut 128. This nut is adapted to clamp the tapered pin 36 to the head plate through pressure exerted upon the cross pin 50 by a hardened steel washer 52. The head 130 of the camera attaching screw 88 does not have the radially drilled holes which are present in the head of the screw previously described but merely has its outer cylindrical portion knurled as best shown in Figure 6 so that it may be conveniently manipulated when attaching and detaching the camera to the head. In other respects the construction is similar to that previously described.

The use of this head is the same as that previously described with the exception that greater care must be observed in leveling the head 122 by properly positioning the tripod legs 16, since no other means are provided for leveling. The head is capable of use in taking "pan" and "tilt" views and may be clamped so as to take stationary views in a manner similar to that above described with reference to the construction shown in Figures 1 to 5.

In Figures 8, 9 and 10 I have shown a modified construction which utilizes most of the principles of the devices previously described but which, in addition, provides means for steadying the movement of the camera when taking "pan" and "tilt" views. The head comprises a plate 14 pivotally carried by tripod legs 16, in which a ball 132 is universally mounted in the same manner as described with reference to Figure 2. The ball 132 has a tapered bore 134 which is adapted to receive the tapered end portion 136 of a vertical post 138; the post being secured thereto by a kerfed nut 140 threaded over the lower extremity of the post, a hardened steel washer 142 and a lock washer 144 being interposed between the nut 140 and a shoulder 146 formed by a recess in the ball 132. The upper portion of the post is axially bored and has a hardened tubular bearing plug 148 pressed therein so as to be substantially integral therewith. A casing 150 having a cover portion 152 secured thereto by screws 153 is rotatably mounted on the post 138 bearing thereon at points 154 and 156. The cover portion 152 is formed integrally with an upwardly projecting member 158 which is transversely bored to receive a tapered pintle 160. The pintle has tapered bearing surfaces 162 and 164 for a "tilt" socket member 166 which has an upwardly extending yoke portion to which the camera supporting plate 168 is attached by suitable screws (not shown). A camera attaching screw 88, having an enlarged hollow head portion 89 is mounted therein in a manner similar to that previously described with reference to the structure shown in Figure 2. By analogy to the structure shown in Figures 1 to 5 inclusive it will be apparent that the "tilt" socket member 166 may be rotated about the tapered pintle 160 and that the member 158 which is formed integrally with the casing cover 152 may be rotated about the post 138. In the latter rotative movement the casing cover 152 bears downwardly upon the plug member 148 through the medium of a downwardly flanged hardened disc 170 which contacts with the beveled end surface 172 of the plug 148.

The pintle 160 is secured to the member 158 by a cap screw 174 which is threaded in the pintle and has a lock washer 176 located in a recess formed at the top of the member 158, the washer serving as a means to hold the pintle 160 in firm engagement with the bore of the member 158. It will be noted that said bore has a shallow groove 178 at the upper portion thereof so that as the screw is drawn tight, the member 166 bears upon the surface of the pintle 160 at the sides of the groove 178, with the result that two separate lines of contact are assured to make the connection between these parts perfectly rigid.

The upper end of the post 138 has an outwardly and downwardly projecting flange 180 (Figure 10) which tapers inwardly at a small angle to provide a frusto-conical friction surface for the complementally tapered bore of a sun gear 182. The sun gear is held or floats loosely in contact or substantially in contact with the flange 180 by a tubular cage 184 which at its lower end has an outwardly extending horizontal flange 186 which fits into a groove 188 formed at the lower inner edge of the sun gear, and has an inwardly extending horizontal flange 190. A flat washer 192 rests upon this inwardly projecting flange 190 and serves as a seat for a relatively strong compression spring 194, the other end of which abuts against a washer 196 which is confined within the cage 184 by an inwardly projecting flange 198 formed at the upper end thereof.

A sleeve 200 has a shoulder 202 which is normally positioned as shown in Figure 10 and is adapted, upon elevation thereof, to compress the spring 194 and through said spring and cage to raise the sun gear 182 and force it firmly in frictional contact with the flange 180. The spring 194 is preferably precompressed so that a greater force may be exerted upon the sun gear 182 when it is desired to frictionally connect said gear with said flange. The cage 184, washers 192 and 196, together with the spring 194 may be assembled as a unit before insertion in the casing, thus making a construction which may be economically manufactured. The sleeve 200 extends substantially the entire length of the casing 150 and at its lower end has a slot fitting over an eccentric 204 which is formed at the end of a shaft 206. The latter has an operating handle 208 rigidly secured thereto. A spring pressed ball detent 210, adapted to be projected into one of a pair of depressions 212 which are formed diametrically opposite each other in the shaft 206, serve to hold the shaft in adjusted position. When in the position as shown in Figure 9 the steadying means may be termed as "off", since the sun gear 182 will be practically free to rotate with respect to the flange 180.

When the shaft 206 is rotated through an angle of 180 degrees the eccentric 204 will raise the sleeve 200, thereby compressing the spring 194 and resiliently forcing the sun gear 182 into firm frictional contact with the flange 180. The inertia controlled steadying means is thereby rendered operative so that the shaft 206 and lever 208 will be termed "on" when in this position. The casing 150 is preferably marked with such designation that the operator may instantly ascertain whether the steadying mechanism is operatively connected or not.

A planetary train of gearing is mounted within the casing 150, having the first pinion of the series enmeshed with the sun gear 182 and the last pinion of the series connected to a fly wheel. This mechanism and gear train is more fully disclosed and claimed in my copending applications, Serial No. 208,220, filed July 25, 1927, and Serial No. 220,493, filed herewith and is of the general type shown in the patent to Akeley, No. 1,177,165, and the patent to Garbutt, No. 1,624,096. Suffice to say that the gearing comprises a speed increasing train of spur gears and pinions which drive a fly wheel, and in which the first pinion of the series is enmeshed with the sun gear 182 so that rotative movement of the casing 150 with respect to said gear will cause planetary movement of the first pinion about the sun gear, thereby setting the train of gears in motion. This mechanism, of course, tends to retard accelerative and decelerative rotation of the housing 150 with respect to the post 138.

I have found it desirable to provide means for exerting a small constant amount of friction between the casing 150 and the post 138. Such means comprises a packing 214 which is compressed between the post 138 and enlarged bore in the bottom of the casing 150 by a gland 216 and nut 218. This packing tends to prevent play between the casing and post and also produces a slight frictional drag tending to prevent rotation of the casing.

I have provided means for clamping the casing 150, 152 to the post 138. Said means comprises a screw 220 threaded in an outwardly extending boss 222 formed integrally with the cover 152, and provided with an operating lever 224 rigidly secured at the outer end thereof. A spring pressed ball detent 226 is adapted to be pressed into suitable concave recess formed in the lever 224 so as to hold said lever in adjusted position. The end of the screw 220 contacts with the plug 148 and is adapted to clamp the latter in the bore 156. A wide shallow groove 228 is formed in said bore diametrically opposite said screw to provide spaced contact surfaces for the plug 148 so that said plug will be rigidly and immovably clamped in said casing cover 152.

The pintle 160 has a short slot 230 formed therein and has a spring disc-shaped washer 232 confined within a recess 234, formed in the side of the "tilt" socket member 166, by a washer 236 held in position by a screw 238. This spring washer takes up any play resultant from wear or other causes and holds the member 166 in light frictional contact with the pintle. A handle 240 having a frusto-conical portion 242 is threaded in the "tilt" socket member at 244 and has an end cylindrical portion 246 fitting in a smooth bore in said member. The frusto-conical portion 242 lies partially within the socket member 166 and partially within an annular groove 248. This groove has a frusto-conical surface 250 against which the portion 242 is adapted to contact. From the above description it will be seen that when the handle 240 is rotated so as to screw inwardly into the socket member 166 the frusto-conical portion 242 thereof will force the socket member 166 to the right relative to the pintle 160, thereby frictionally locking the socket member to the pintle.

Means are provided to steady rotative movement of the socket member 166 about its pintle 160. This means comprises a casing cover 252 formed integrally with the member 166 and having a casing 254 secured thereto by a plurality of screws 256. A tubular element 258 having an outwardly and sidewardly extending flange 260, which is similar in shape to the flange 180 formed in the post 148, has a portion 262 firmly pressed into a suitable bore in the end of the pintle 160 and is prevented from rotation relative to said pintle by a pair of pins 264. The element 258 is rotatably mounted with respect to the casing 254, a hardened steel washer 265 being interposed between the flange 260 and the casing 254 to reduce friction. A train of speed increasing gearing for driving a fly wheel, similar to that previously described, and similar to that disclosed and claimed in the aforesaid applications, is mounted within the casing 254 and is adapted to be rendered operative by manipulation by a lever 266 in a manner as previously described with reference to the "pan" steadying mechanism.

The operation of this device will now be described.

The device is first leveled approximately by positioning the tripod legs 16, and then more accurately by adjusting the ball 132 in the head plate 14, through the use of a spirit level 268. In this operation the handle 240 may be used as a lever in tightening the nut 24 by inserting its cylindrical end 246 into one of the radial holes 32. Having thus fixed the post 138 in exact vertical position, the camera may be attached by rotating the screw 88, again using the handle 240 as a lever if necessary.

If it is desired to utilize the tripod in taking pictures with the camera stationary, the camera is pointed in the desired direction, using the handle 240 as a guiding lever and the parts clamped in adjusted position by turning the handle 240, thus firmly clamping the "tilt" socket member 166 to pintle 160, and clamping the casing cover 152 to the post 138 by manipulation of lever 224.

If it is desired to take a "pan" view the "tilt" socket member is rotated until the camera lies in the desired plane and the handle 240 then rotated to clamp the "tilt" socket member 166 to the pintle 160. The casing 152 is then released from the post 138 by means of the lever 224 and screw 220, thus permitting free rotation of the camera about the post 138.

If it is desired to utilize the steadying mechanism in taking "pan" and "tilt" views as above described, it is merely necessary to throw the levers 208 and 266 to their "on" positions whereby said means will be rendered operative to make it necessary to rotate the camera at a practically constant speed.

If it is desired to take a "pan" view in a plane other than the horizontal or vertical the "tilt" socket 166 is conditioned so as to be freely rotatable with respect to the pintle 160 by partially unscrewing the handle 240, and the lever 224 positioned so that the casing 152 will be freely rotatable about the post 138. With levers 208 and 266 in their "on" positions, the camera may be rotated about an axis other than the horizontal or vertical and since the "tilt" socket 166 is freely rotatable about both a vertical and a horizontal axis, each of the steadying means will operate and tend not only to steady the rotative movement of the camera but also to maintain its rotation in the plane in which its initial movement takes place. It will accomplish this result due to the fact that the "pan" steadying mechanism will tend to maintain the horizontal component of the rotative movement constant while the "tilt" steadying mechanism will tend to maintain the vertical component of the rotative movement of the camera constant and since the components of rotative movement are thus maintained, the direction of rotative movement of the camera will thereby also be maintained.

If it is desired suddenly to jerk the camera from one position to another with the steadying means operative, this may be accomplished by exerting a sudden force upon the guiding handle 240 sufficient to break the frictional contact between the sun gears 182 and the flanges 180 and 260. This frictional connection is highly desirable when, for example, it is desired to photograph an object moving regularly but which suddenly increases its speed.

While I have shown and described particular embodiments of my invention, it will be apparent to those skilled in the art that the principles thereof may be embodied in other devices without departure from the basic conception of my invention. I therefore desire the scope of my invention to be limited only by the claims which follow.

I claim:

1. In a device of the class described, the combination of a tripod head plate, a tapered post rotatable with respect to said plate, means for clamping said post to said plate, a tapered pin secured near the top of said post and perpendicular thereto, a camera supporting member pivotally mounted upon said pin and having a tapered bore bearing upon a tapered portion of said pin, and means to clamp said member to said pin comprising a handle threaded in said member and having a frusto-conical portion positioned to engage a portion of said pin, whereby rotation of said handle in one direction will force said member toward the larger end of said pin.

2. In a device of the class described, the combination of a tripod head plate, a tapered post rotatable with respect to said plate, means for clamping said post to said plate, a tapered pin secured near the top of said post and perpendicular thereto, a camera supporting member pivotally mounted upon said pin and having a tapered bore bearing upon a tapered portion of said pin, and manually operable means movable transversely with respect to said pin and guided in said member to clamp said member to said pin, said means having a tapered portion engaging said pin.

3. In a device of the class described, the combination of a tapered pin having an annular groove, a camera supporting member pivoted upon said pin and having a bore substantially conforming to the shape of said pin, a handle threaded in said member and extending transversely to said pin and lying partially in the groove thereof and adapted to engage the sides thereof, and a frusto-conical portion on said handle adapted upon rotation thereof in one direction to force said member in the direction of the outward taper of said pin, whereby said member may be firmly clamped against rotation on said pin by increasing the friction therebetween.

4. In a device of the class described, the combination of a tapered pin having an annular groove with a frusto-conical surface substantially perpendicular to the tapered surface of said pin, a camera supporting member pivoted upon said pin and having a bore substantially conforming to the shape of said pin, a handle for pivoting the handle supporting member about said pin, said handle being threaded in said member and extending transversely to said pin and lying partially in the groove thereof, and a frusto-conical portion on said handle adapted upon rotation thereof to cooperate with said frusto-conical surface of said groove and thereby force said member in the direction of the outward taper of said pin, whereby said member may be firmly clamped against rotation on said pin.

5. In a device of the class described, the combination of a pin having its two end portions tapered in the same direction, and adapted to be supported at its center, a yoke-shaped camera supporting member pivotally mounted on said pin and having tapered bores bearing upon the tapered portions of said pin, and means for rigidly clamping said member to said pin comprising a handle having a frusto-conical portion adapted to contact with said pin, guided by said member, and extending transversely of said pin.

6. In a device of the class described, the combination of a universally mounted post adapted to be clamped in a vertical position, a casing rotatably supported by said post, means to clamp said casing to said post, a tapered pin secured to said casing and extending perpendicular to the axis of said post, a camera supporting member pivotally mounted upon said pin and having a bore complemental to the taper of said pin, means for rigidly clamping said member to said pin, a casing rigid with said member, inertia controlled steadying means in said casings operative to retard accelerative and decelerative movement of said member relative to said post, and means to render said steadying means inoperative.

7. In a device of the class described, the combination of a universally mounted post adapted to be clamped in a vertical position, a casing rotatably supported by said post, means to clamp said casing to said post, a tapered pin secured to said casing and extending perpendicular to the axis of said post, a camera supporting member pivotally mounted upon said pin and having a bore complemental to said tapered pin, means for rigidly clamping said member to said pin, a casing rigid with said member, and inertia governed acceleration and deceleration retarding means in said casings, one of said retarding means being operative to govern rotation of said member about a vertical axis and the other of said retarding means being operative to govern rotation of said member about a horizontal axis.

8. In a device of the class described, the combination of a vertical post, a casing rotatably supported by said post, a tapered pin secured to said casing and extending perpendicular to the axis of said post, a camera supporting member pivotally mounted upon said pin and having a tapered bore for cooperation with said tapered pin, a casing rigid with said member, inertia controlled steadying means in said casings operative to retard accelerative and decelerative movement of said member relative to said post, and means to render said retarding means inoperative.

9. In a device of the class described, the combination of a vertical post, a casing rotatably supported by said post, a tapered pin secured to said casing and extending perpendicular to the axis of said post, a camera supporting member pivotally mounted upon said pin, said member having a tapered bore to receive said tapered pin a casing rigid with said member, and an inertia controlled steadying means in each of said casings operative to retard accelerative and decelerative movement of said member relative to said post.

10. In a device of the class described, the combination of a vertical post, a casing rotatably supported by said post, a tapered pin secured to said casing and extending perpendicular to the axis of said post, a camera supporting member pivotally mounted upon said pin, said member having a tapered bore to receive said tapered pin, a casing rigid with said member, inertia governed acceleration and deceleration retarding means in said casings, and mechanical connections to render one of said retarding means operative to govern rotation of said member about a vertical axis and the other of said retarding means operative to govern rotation of said member about a horizontal axis.

11. In a device of the class described, a relatively stationary post having an outwardly and downwardly extending flange, a casing rotatable upon said post, speed increasing gearing in said casing, a central gear normally rotatable with respect to said flange and meshing with said gearing, and means for frictionally connecting said gear to said flange comprising a rotatably and axially mounted sleeve, resilient means between said sleeve and said gear, and manipulative means to force said sleeve against said resilient means.

12. In a tripod head, a stationary member, an inertia steadying means, a planetary gear train for driving said means upon rotation of said camera, and means for frictionally holding one of the gears of said train stationary comprising a reciprocable element, a cage engaging said gear, and a normally compressed spring confined within said cage having one end adapted to be engaged by said element whereby when said sleeve is moved upwardly it will force said gear into frictional engagement with said member to render said steadying means operative.

13. In a device of the class described, a hollowed head plate, a universally movable ball adapted to be fixedly clamped thereto, a tapered post rotatable in a tapered bore in said ball, means for exerting a constant frictional force tending to prevent rotation of said post in said ball, and means for clamping said post to said ball.

14. In a device of the class described, the combination of a tapered vertical post, a pin rigidly secured at its center to the top of said post and at right angles thereto, said pin having tapered portions on the opposite sides of said post, and a yoke shaped camera supporting member pivotally mounted on said pin and bearing upon and complemental to the tapered portions thereof.

15. In a device of the class described, the combination of a tapered vertical post normally rotatable about its axis, a pin secured to said post and passing transversely therethrough, and a camera supporting member having a smooth bore bearing upon said pin, the bearing surfaces of said post and pin having longitudinal grooves cut therein.

16. In a device of the class described, the combination of a normally stationary horizontal pin, a camera supporting member pivotally mounted on said pin, a casing carried by said member, inertia controlled steadying mechanism including planetary gearing mounted within said casing, said gearing comprising a sun gear, a tapered clutch member held against rotation with respect to said pin but capable of limited longitudinal movement relative thereto, friction reducing means between said clutch member and said camera supporting member, and manually operable means for forcing the sun gear of said planetary gearing into frictional engagement with said clutch member.

17. In a device of the class described, the combination of a relatively stationary vertical post, a camera-carrying casing rotatably mounted on said post, means comprising frictional packing between the said casing and said post for exerting a frictional drag tending to prevent free rotation of said casing relative to said post and means to adjust the pressure of said packing to vary the amount of frictional drag.

18. In a device of the class described, the combination of a normally stationary vertical post having a conical upper end surface, a casing member adapted to rotate with respect to said post, and having a cylindrical socket portion fitting over the end of said post, a hardened peripherally downwardly flanged disk positioned between the end of said post and said socket member with the internal edge of said flange in contact with the conical end surface of said post, whereby said casing is maintained in axial alignment with said post and serves as an end bearing therefor, and means for exerting pressure on the side of said post to clamp the latter to said casing.

In witness whereof, I hereunto subscribe my name this 2 day of September, 1927.

OSCAR U. ZERK.